United States Patent
Giro Amigo

(10) Patent No.: US 10,295,398 B2
(45) Date of Patent: May 21, 2019

(54) METHOD FOR PROVIDING A PREDETERMINED NUMBER OF CONTIGUOUS STORED ELEMENTS FORMING A LINE, DEVICE FOR CARRYING OUT SAID METHOD, AND A COMBINATION WEIGHING MACHINE COMPRISING SAID DEVICE

(71) Applicant: Girnet Internacional, S.L., Badalona (ES)

(72) Inventor: Ezequiel Giro Amigo, Badalona (ES)

(73) Assignee: Girnet Internacional, S.L., Badalona (ES)

( * ) Notice: Subject to any disclaimer, the term of this patent is extended or adjusted under 35 U.S.C. 154(b) by 150 days.

(21) Appl. No.: 15/341,134

(22) Filed: Nov. 2, 2016

(65) Prior Publication Data

US 2017/0122793 A1    May 4, 2017

(30) Foreign Application Priority Data

Nov. 2, 2015 (ES) .................................. 201531566

(51) Int. Cl.
*G01G 19/387* (2006.01)
*G01G 13/24* (2006.01)
(Continued)

(52) U.S. Cl.
CPC .......... *G01G 19/387* (2013.01); *B65B 25/04* (2013.01); *B65B 39/007* (2013.01); *B65B 57/20* (2013.01);
(Continued)

(58) Field of Classification Search
CPC ...... G01G 19/387; G01G 13/24; B65B 25/04; B65B 39/007; B65B 57/20; B65G 27/04;
(Continued)

(56) References Cited

U.S. PATENT DOCUMENTS 3,705,475 A * 12/1972 Riley ..................... B65B 5/101
53/240
4,901,861 A * 2/1990 Cicchelli ................. A23N 4/00
198/690.2

(Continued)

FOREIGN PATENT DOCUMENTS

| ES | 480272 A1 | 12/1979 |
| ES | 258916 Y | 12/1981 |
| ES | 258970 Y | 12/1981 |

OTHER PUBLICATIONS

Spanish Search Report issued in ES 201531566 dated May 10, 2016.

*Primary Examiner* — Natalie Huls
*Assistant Examiner* — Monica S Young
(74) *Attorney, Agent, or Firm* — Sughrue Mion, PLLC

(57) ABSTRACT

A method for providing a predetermined number of contiguous stored elements (A,B,C,D,E,F,G), that is which are touching each other, and in a line (2) in a supply chute (3) along which the line (2) may advance, these elements being essentially spheroidal, such as fruit, wherein initially the first element (A) in the line (2) is retained by retention means (4), comprising the operation of counting, by means of the emission and detection of a steady beam (6) of light, the signal variations produced in said detection by the line (2) advancing, specifically by the passage of the spaces between two consecutive elements in the line (2) through the detection beam (6), aiming the beam (6) at the gaps (7) that necessarily will be formed in the line (2) between two consecutive elements even if they are contiguous, due to the effect of said elements (A,B,C,D,E,F,G) being spheroidal.

17 Claims, 9 Drawing Sheets

(51) Int. Cl.
*G01S 17/88* (2006.01)
*B65B 25/04* (2006.01)
*B65B 57/20* (2006.01)
*B65G 27/04* (2006.01)
*B65G 43/08* (2006.01)
*B65G 47/88* (2006.01)
*B65B 39/00* (2006.01)

(52) U.S. Cl.
CPC ............. *B65G 27/04* (2013.01); *B65G 43/08* (2013.01); *B65G 47/8823* (2013.01); *G01G 13/24* (2013.01); *G01S 17/88* (2013.01); *B65G 2201/0211* (2013.01); *B65G 2203/0241* (2013.01); *B65G 2205/02* (2013.01)

(58) Field of Classification Search
CPC ............... B65G 43/08; B65G 47/8823; B65G 2201/0211; B65G 2203/0241; B65G 2205/02; G01S 17/88

USPC ........................................................ 73/29.05
See application file for complete search history.

(56) References Cited

U.S. PATENT DOCUMENTS

| | | | | |
|---|---|---|---|---|
| 4,999,977 | A * | 3/1991 | Briscoe | B65B 25/04 53/385.1 |
| 5,029,431 | A * | 7/1991 | Weening | B65B 5/101 53/171 |
| 6,659,287 | B1 * | 12/2003 | Hawkins | B07C 5/36 198/483.1 |
| 2008/0151220 | A1 * | 6/2008 | Hershtik | A01K 43/00 356/51 |
| 2013/0239525 | A1 * | 9/2013 | Hammacher | B65B 5/068 53/473 |
| 2015/0291302 | A1 * | 10/2015 | McNestry | B65C 9/1865 156/64 |
| 2016/0244264 | A1 * | 8/2016 | Abbas | B26D 7/32 |

* cited by examiner

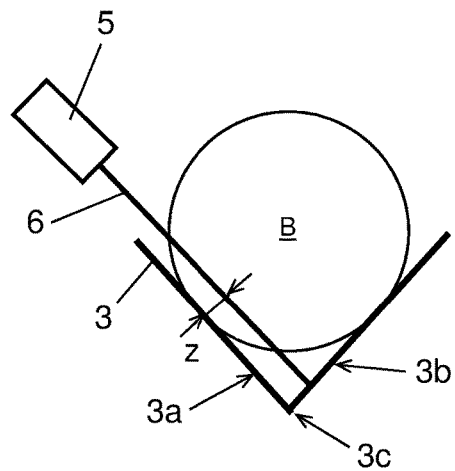 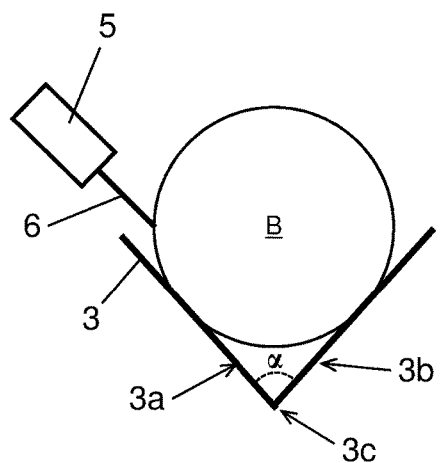
Fig. 2a  Fig. 2b
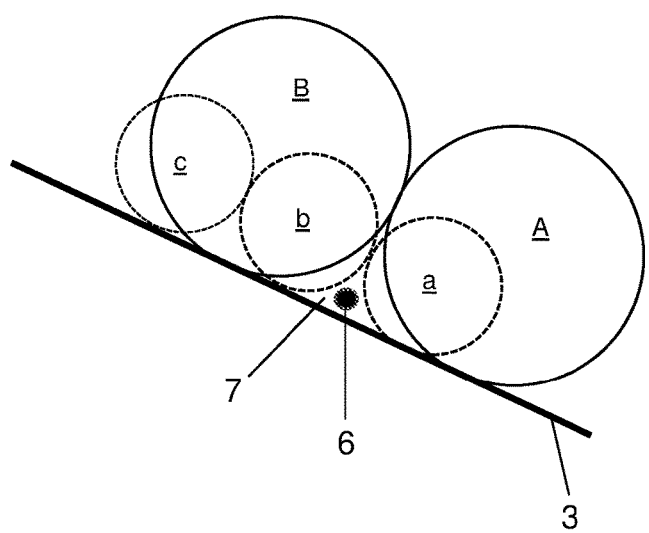
Fig. 2c

METHOD FOR PROVIDING A PREDETERMINED NUMBER OF CONTIGUOUS STORED ELEMENTS FORMING A LINE, DEVICE FOR CARRYING OUT SAID METHOD, AND A COMBINATION WEIGHING MACHINE COMPRISING SAID DEVICE

APPLICATION FIELD OF THE INVENTION

The invention relates to a method for providing a predetermined number of contiguous stored elements forming a line, which is particularly suited to fruit and vegetable products such as oranges, apples, mandarins, etc. The invention also relates to a device for carrying out said method, and to a combination weighing machine comprising said device.

BACKGROUND OF THE INVENTION

In the field of packaging fruit and vegetable products, there are known combination weighing machines that comprise two transmissions with parallel chains, between which are arranged carriages that are joined to the chains such that the coordinated movement of said chains in the same direction makes the carriages move along a closed path. There are buckets attached to these carriages, and the machines comprise a series of work stations distributed along the path followed by the carriages, and by extension the buckets attached to the carriages, such as a loading station where for example fruit is fed into the buckets; a weighing station where the fruit contained in each bucket is weighed; and an emptying or unloading station where the buckets are emptied.

In so-called combination weighing machines, several buckets are attached to the same carriage, each carriage defining a row of buckets, and at the emptying station there is a selective emptying of the buckets, attached to the same carriage or to different carriages, whose total fruit weight is closest to a predetermined value.

Conventionally, the loading station comprises a series of tilted chutes that are suitable for receiving the fruit, such that in each chute the pieces of fruit are arranged contiguously and in alignment to form a line, moving by the force of gravity until they fall into the buckets. This type of chutes usually include vibration means to help the pieces move along better.

For each container, a predetermined number of pieces of fruit is set to be introduced from said feed chutes, which will vary depending on the type of fruit to handle and the total weight one wishes to package. For this purpose there are known counting devices that make it possible to count the pieces of fruit as they are introduced into the buckets and which, furthermore, once the bucket has been loaded with a required number of pieces of fruit, it is capable to generate a signal to a retention means envisaged to momentarily stop the pieces of fruit from moving along the chute until another empty bucket is situated beneath the outlet of said chute for the next load, and so on.

A known type of devices for counting pieces of fruit is based on the use of mechanical means, such as switches that are pressed by the pieces of fruit through contact as they pass over them.

Another type of counting devices is known, which use photoelectric cells that emit a beam of light that is interrupted by the passage of the pieces of fruit, i.e. the counting takes place when the beam detects the passage of a piece of fruit.

By way of example, Spanish utility model ES258970 describes a counting device comprising three photoelectric cells, each one housed upon a vibrating chute, with their respective reflection mirrors, the chutes being arranged at an incline so that the pieces of fruit distributed in a line fall by the force of gravity into a collection hopper. The light beams of the cells are interrupted by the passage of each of the pieces of fruit once they have left the chutes and fall into the hopper, counting in this way the units collected in the hopper.

This type of device has the drawback that it is not suitable for counting pieces of fruit when they are circulating on the chute, since as the pieces form a contiguous line, i.e. are touching one another, the beam could detect two or more pieces of contiguous fruit as if they were one single object, meaning the beam would not be interrupted, leading to a counting error. As a result, this device is only suitable for counting the pieces of fruit once they have left the chute, i.e. when they fall by gravity into the collection hopper, since it is during the path of the fall that a certain separation appears between the pieces of fruit.

It would be desirable to have a supply device with counting means capable of detecting the passage of pieces of fruit when they are still circulating in the chute, even if they are forming a contiguous line, i.e. even in there is no separation between the pieces as they move over the chute.

Unlike the known solutions that are capable of indicating the number of pieces that are supplied, wherein the counting is done when the pieces leave the chute, a supply device capable of carrying out the counting when the pieces are still in the chute will make it possible to control the exact number of pieces that are supplied and emptied into an associated bucket.

Moreover, there are known retention devices envisaged for interrupting the supply of fruit when a bucket has been loaded with a predetermined number of pieces of fruit. This type of devices use folding vanes, each one associated with the end of a chute, which from above interfere with the path of the pieces of fruit. By way of example, Spanish utility model ES258916 describes a device of this type that comprises a series of pivoting vanes articulated to a transmission mechanism that allows a given vane to descend and retain the piece of fruit in the chute, or to raise up to allow the pieces of fruit to circulate.

This retaining device has the drawback that even though the maximum rotation of the vanes is adjustable, not all pieces have the same dimensions, meaning that larger pieces may get squeezed when the vane enters into contact with them to stop them from passing through.

It would also be desirable to have a supply device capable of interrupting the supply of fruit in coordination with the counting means prepared to carry out the retention operation in an improved manner that guarantees gentle contact with the pieces of fruit to avoid them from potentially being damaged.

DESCRIPTION OF THE INVENTION

For the purpose of providing a solution to the problems set out above, we shall disclose a method for providing a predetermined number of contiguous stored elements, that is which are touching each other, and in a line in a supply chute along which the line may advance, these elements being essentially spheroidal, such as fruit, and wherein initially the first element in the line is retained by retention means that prevent the line from sliding and advancing, which method comprises the operations of:

a) actuating the retention means to stop retaining the first element in the line, allowing the line to advance along the chute,
b) counting, by means of the emission and detection of a steady beam of light, the signal variations produced in said detection by the advance of the line, specifically by the passage of the spaces between two consecutive elements in the line through the detection beam, aiming the beam at the gaps that necessarily will be formed in the line between two consecutive elements even if they are contiguous, due to the effect of said elements being spheroidal, and
c) when the signal variations reach a number equal to the predetermined number of elements that is wished to provide, actuating again the retention means to retain the new first element in the line.

Thus, it is obtained a device capable of counting a predetermined number of spheroidal elements arranged contiguously forming a line and which can move along a chute, through the use of detection means provided with a beam of light that detects the passage of the gaps between every two elements, such that when the predetermined number of elements has been provided, for example to a collection bucket situated at the outlet of the chute, a signal is sent to retention means which momentarily interrupt the supply of elements.

In this way, the fact of the beam of light detecting the passage of the gap between every two contiguous spheroidal elements on the chute, guarantees a quick and reliable count of said elements, unlike what happened with devices known in the state of the art, which were unfit to count contiguous elements since the beam of light detected the passage of the element itself, requiring that there be a certain degree of separation between them in order to avoid miscounting.

Advantageously, the operation of counting the signal variations is carried out by counting the variations in the intensity of the detection beam. In this sense, during the step of detecting the beam, each time a reduction in the intensity of the reflected beam is detected, below a predetermined threshold, and immediately thereafter an increase in the intensity of the reflected beam, above a predetermined threshold, a space is counted.

Therefore, the reduction in the intensity of the reflected beam is brought about when the beam travels a greater length, in this case when it passes through a gap between two contiguous elements, hitting a wall of the chute, while the increase in intensity is brought about when the beam of light hits the surface of one of the elements.

Advantageously, the same method is suitable for counting even when the elements that pass through the beam of light are not contiguous and are momentarily separated, but ensures correct counting when the consecutive elements in the line are contiguous.

In this way, when said first element is released and advances such that the beam of light detects the gap between this first element and the next one in the line, one element is counted, and so on until a predetermined number of provided elements is reached, at which point the retention means act upon the next element, blocking the line from advancing.

According to another aspect, the invention also relates to a device capable of providing a predetermined number of contiguous stored elements forming a line, that is which are touching each other, comprising:
a supply chute along which the line may advance by the force of gravity, said elements being essentially spheroidal, such as fruit;
retention means capable to be actuated by a motor and adapted to retaining the first element in the line and preventing the line from sliding and advancing, and to stop retaining the first element in the line, allowing the line to advance along the chute; and
emission and detection means of a steady beam of light aimed at the chute, adapted to count the signal variations produced in said beam by the advance of the line, specifically by the passage of the spaces between two consecutive elements in the line through the detection beam, the beam being aimed at the gaps that necessarily will be formed in the line between two consecutive elements even if they are contiguous, due to the effect of said elements being spheroidal, and adapted to actuating the retention means to stop retaining the first element in the line, and actuating again the retention means to retain the next element in the line when the signal variations reach a number equal to the predetermined number of elements that is wished to provide.

Analogously, the emission and detection means are adapted to counting the variations in the intensity of the detection beam. In this sense, the emission and detection means are adapted to counting a space, so that during the step of detecting the beam, each time a reduction in the intensity of the reflected beam is detected, below a predetermined threshold, and immediately thereafter an increase in the intensity of the reflected beam, above a predetermined threshold, a space is counted.

According to a preferred embodiment, the supply chute has a V-shaped transverse cross section determining two walls joined by a bottom vertex, the detection beam being aimed adjacent to one of the walls to strike the other wall at a point that is a predetermined distance away from the bottom vertex.

The invention foresees that said distance between the striking point of the detection beam and the bottom vertex of the chute is comprised between 0.1 and 30 millimeters. According to a preferred embodiment, the detection beam is parallel to said first wall of the chute. Preferably, the distance separating the beam from said first wall of the chute is 0.1 to 30 mm; more preferably 0.1 to 20 mm; still more preferably 3 to 5 mm; and in a desired embodiment, this distance is 4 mm.

In this way, regardless of the size of the elements, the detection beam will always be able to detect the gap between every two spheroidal elements, as a result of the striking point of the detection beam being focused on an area at the bottom of the chute.

Advantageously, the striking point of the detection beam is arranged upstream from the retention means. This ensures that when the predetermined number of elements has been reached, the retention means can act immediately to retain the next element, which then becomes the first element in the line to begin a new sequence.

Preferably, the retention means comprise a gripper provided with a flexible finger, capable of adapting to the contour of the first element in the line. For example, it is envisioned that adaptive grippers such as those using Fin Ray Effect® technology will be used.

According to a preferred embodiment, the gripper is mounted on the end of a pivoting support that is actuated by means of a connecting rod and crank mechanism, the crank being articulated at one end to the pivoting support at a point near to the gripper and at the other end to the connecting rod, and said connecting rod being actuated by the motor, preferably an electric one, such that when the motor rotates in one direction, the gripper is capable to be raised, allowing the line of elements to advance along the chute, and when the motor rotates in the opposite direction the gripper is capable to be descended until entering into contact with the first element in the line to retain it in the chute.

This configuration allows to obtain a transmission mechanism that is structurally simple and very compact, transmitting the movement of the motor torque to the gripper with precision.

Advantageously, the motor is a motor with torque control, whose torque calibration depends on the size of the elements supplied in the chute, and allows the motor to be stopped during a retention maneuver when the resistive torque surpasses a previously calibrated value, thus preventing the fruit from getting damaged.

In accordance with another characteristic of the device, the tilt of the chute is greater than 4°. Preferably, the tilt of the chute is 8°.

The device of the invention ensures greater speed and precision in counting the elements arranged in the chute, unlike what happens with the chutes known in the state of the art, and therefore allows the selection of a chute inclination and a range of vibration thereof that are outside of conventional ranges.

In accordance with another characteristic of the device, the chute is provided with vibration means. Said vibration means help the line of contiguous elements move along the chute, keeping it from getting jammed.

Preferably, the vibration means are adapted to deliver a vibration of at least 5 millimeters of amplitude with a frequency of more than 40 Hz. These vibration parameters make it possible to optimize the speed at which the contiguous elements move along the chute.

According to another aspect, the invention also relates to a combination weighing machine that comprises a plurality of devices as described above, said machine being provided with control means adapted to indicate, to each device, the number of elements it should provide to a bucket that its chute opens into.

Advantageously, every two devices provide elements to the same bucket. In this way, the number of elements provided to each bucket is duplicated, thereby optimizing the production time of the machine.

Preferably, said devices are arranged at a loading station arranged above a closed-path transport system for the continuous movement of the buckets.

BRIEF DESCRIPTION OF THE DRAWINGS

The attached drawings illustrate, by way of a non-limiting example, a preferred embodiment of the device that is able to provide a predetermined number of contiguously stored pieces of fruit, in this example oranges, forming a line, and of a combination weighing machine comprising said devices. In said drawings:

FIG. 2a is a schematic view in transverse cross section of the supply chute, showing the detection beam striking the wall of the chute after passing through the gap between two contiguous oranges;

FIG. 2b is a schematic view in transverse cross section of the supply chute, showing the detection beam directly striking an orange;

FIG. 2c is a schematic view of the effect achieved by aiming the beam of light at the optimal area, regardless of the size of the oranges;

DETAILED DESCRIPTION OF THE DRAWINGS

Figure 1:
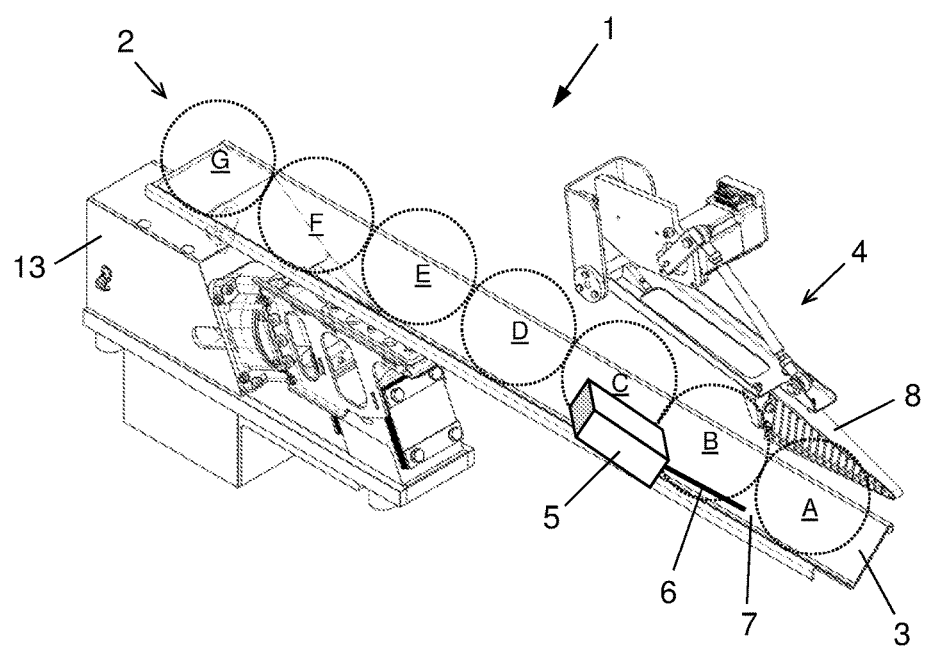
FIG. 1 is a perspective view of the device for providing a predetermined number of contiguously stored oranges forming a line.

FIG. 1 shows a device 1 for providing a predetermined number of contiguous stored elements A,B,C,D,E,F,G in a line 2, that is which are touching each other, comprising a supply chute 3 along which the line 2 may advance through gravity, these elements A,B,C,D,E,F,G being essentially spheroidal, in this example oranges; retention means 4 adapted to retain the first element A in the line 2 and to prevent the line 2 from sliding and advancing, and to stop retaining the first element A in the line 2, allowing the line 2 to advance along the chute 3; and emission and detection means 5 of a steady beam 6 of light aimed at the chute 3 and adapted to count the variations in the intensity (I) signal of the detection beam 6, as will be explained further on.

The method carried out by the device 1 to provide a predetermined number of oranges A,B,C,D,E,F,G comprises the operations of:

a) actuating the retention means 4 to stop retaining the first orange A in the line 2, allowing the line 2 to advance along the chute 3, b) counting, by means of the emission and detection of a steady beam 6 of light, the signal variations produced in said detection by the advance of the line 2, specifically by the passage of the spaces between two consecutive oranges in the line 2 through the detection beam 6, aiming the beam 6 at the gaps 7 that necessarily will be formed in the line 2 between two consecutive oranges even if they are contiguous, due to the effect of said oranges A,B,C,D,E,F,G being spheroidal, and c) when the signal variations reach a number equal to the predetermined number of oranges that is wished to provide, for example three oranges A,B,C, actuating again the retention means 4 to retain the new first orange D in the line 2.

In FIGS. 2a and 2b it can be seen how the supply chute 3 has a V-shaped transverse cross section determining two walls 3a,3b joined by a bottom vertex 3c, the detection beam 6 being aimed adjacent to one of the walls 3a to strike the other wall 3b at a point that is a predetermined distance z away from the bottom vertex 3c. In the illustrated embodiment it can be seen how the detection beam 6 is parallel to said first wall 3a of the chute 3. Moreover, in this example, the distance z between the striking point of the detection beam 6 and the bottom vertex 3c is 4 millimeters, and the angle α formed between walls 3a and 3b is 90 degrees.

In this way, regardless of the size of the oranges, the detection beam 6 will be able to detect the gap 7 between every two contiguous oranges, as a result of the striking point of the detection beam 6 being focused on an area at the bottom of the chute 3, as illustrated schematically in FIG. 2c, wherein two superimposed lines of differently sized oranges have been illustrated. In this example, it can be seen how the detection beam 6 makes it possible to detect the gap 7 that necessarily will be formed between two contiguous oranges, both in the line of larger oranges A, B and in the line of smaller oranges a, b, c.

Each time a reduction in the intensity (I) of the reflected beam 6 is detected, below a predetermined threshold (Ith), and immediately thereafter an increase in the intensity (I) of the reflected beam, above a predetermined threshold (Ith), a space is counted. In other words, the reduction in the intensity (I) of the reflected beam 6 is brought about when the beam 6 travels a greater length, in this case when it passes through a gap 7 between two contiguous oranges A,B, hitting a wall 3*b* of the chute 3 (see FIG. 2*a*), while the increase in intensity (I) is brought about when the beam 3 of light hits the surface of one of the oranges B (see FIG. 2*b*).

In one form of embodiment, the detection beam 6 is a laser beam. Specifically, a laser photocell with a built-in amplifier is arranged. In one example, the diameter of the point of light is 0.5 mm. The implementation of the invention was favourable using, for example, a model E3Z laser photocell with built-in amplifier commercialized by Omron.

FIGS. 3*a* to 3*g*, respectively, show a sequence of counting the oranges A,B,C,D,E,F,G provided by the device 1 as the line 2 of contiguous oranges advances along the chute 3, indicating the striking point of the beam 6 of light, and further showing a graph of the variations in intensity (I) detected by the beam 6 of light.

In the example shown, the predetermined number of oranges that is wished to provide is three oranges A, B, C.

Figure 3A:
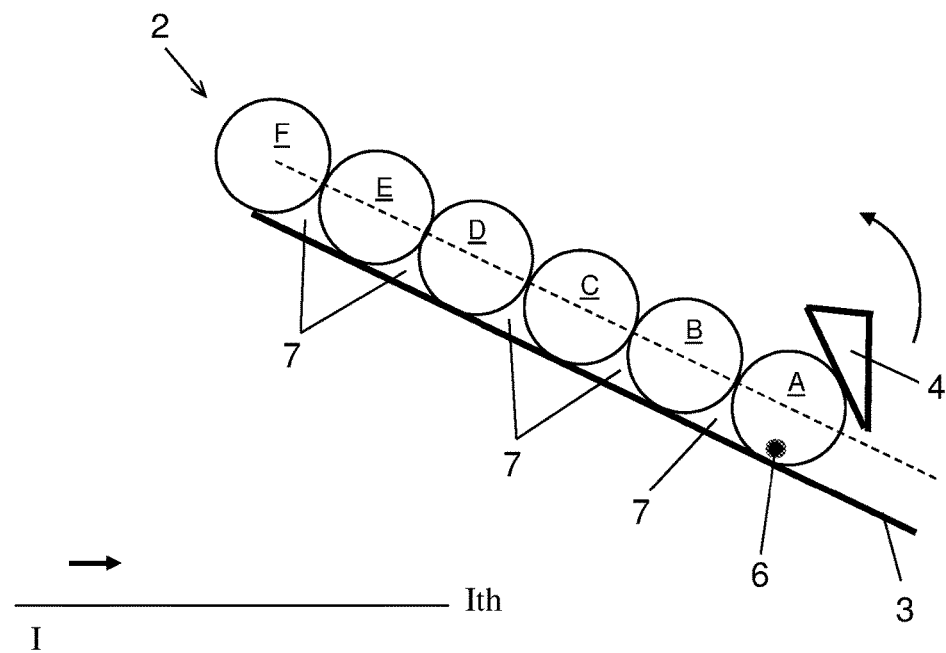
FIGS. 3a to 3g, respectively, show the sequence of counting the oranges provided by the device object of the invention as the line of contiguous oranges advances along the chute, indicating the striking point of the detection beam of light, and further showing a graph of the variations in intensity detected by the beam of light.

FIG. 3*a* shows the initial moment when, while the first orange A in the line 2 is retained by the retention means 4, the detection beam 6 strikes said first orange A. The graph shows that an intensity (I) value has been detected that is higher than the predetermined threshold (Ith) value.

Figure 3B:
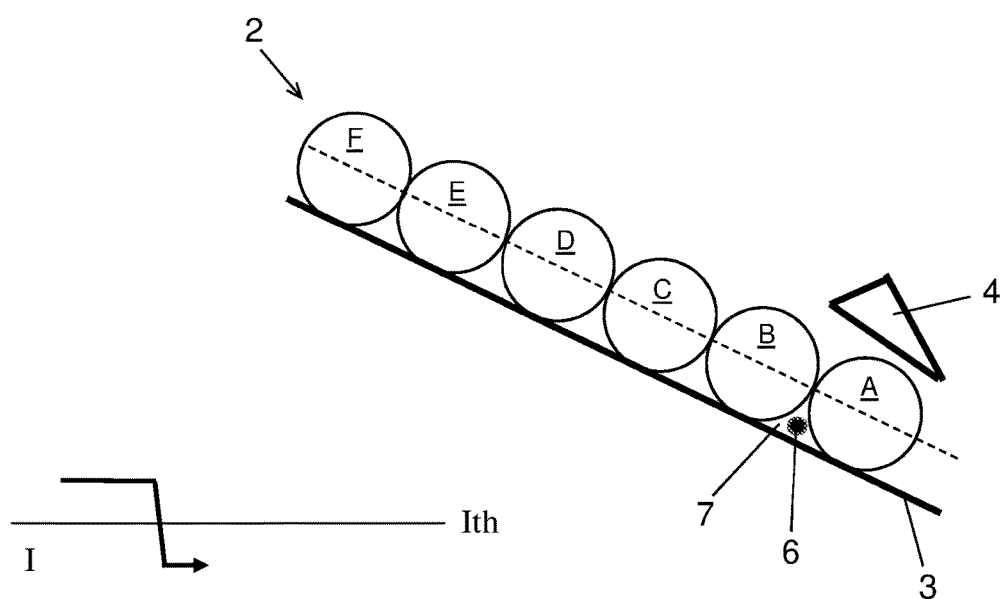

FIG. 3*b* shows the moment at which said first orange A is released by the retention means 4, and begins to advance over the chute 3 such that the beam 6 of light detects the gap 7 between this first orange A and the second continuous orange B in the line 2. The graph shows how the intensity (I) value detected is, at this moment, lower than the predetermined threshold (Ith) value.

Figure 3C:
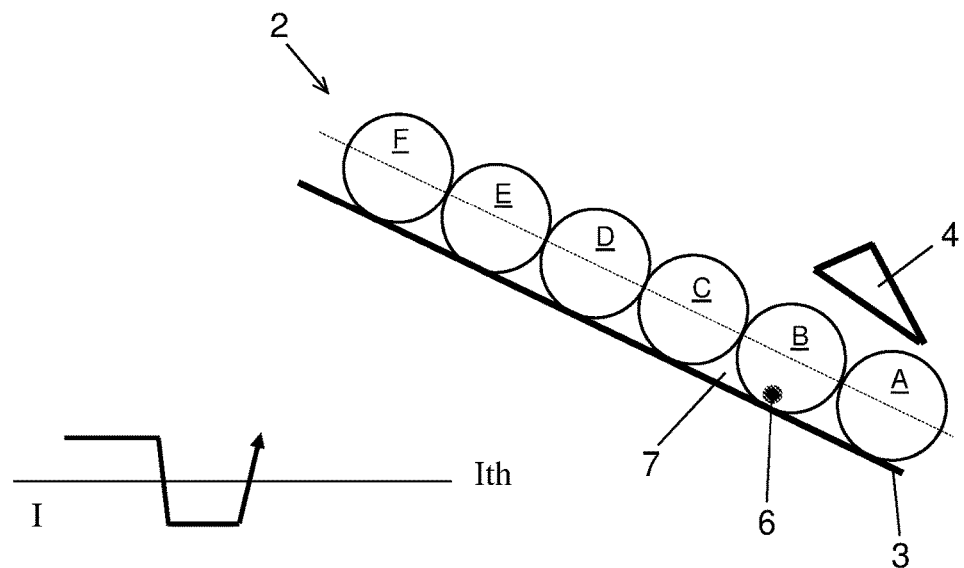

FIG. 3*c* shows the moment at which the line 2 continues to advance such that the beam 6 of light detects the second orange B in the line 2. At this instant, the graph again shows an intensity (I) value that is higher than the predetermined threshold (Ith) value.

As a result, the detection means 5 count a first space since, as has already been mentioned, each time a reduction in the intensity (I) of the reflected beam 6 is detected, below a predetermined threshold (Ith), and immediately thereafter an increase in the intensity (I) of the reflected beam, above a predetermined threshold (Ith), a space is counted. Therefore, this first counted space indicates that the device has provided a first orange A.

Figure 3D:
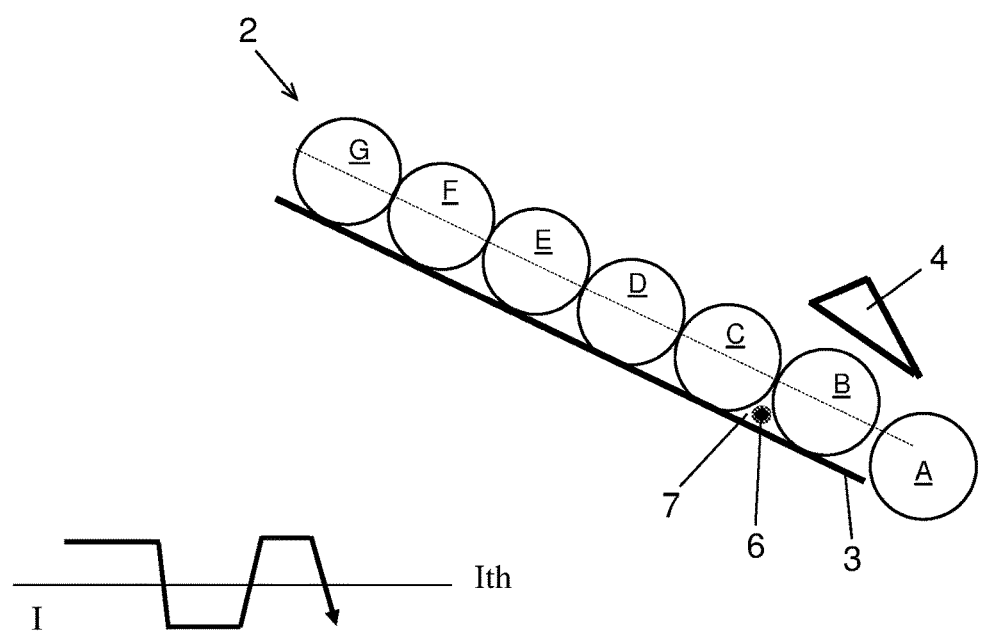

FIG. 3*d* shows the moment at which the line 2 continues to advance such that the beam 6 of light detects the gap 7 between the second orange B and the third contiguous orange C in the line 2. The graph shows how the intensity (I) value detected is again lower than the predetermined threshold (Ith) value.

Figure 3E:
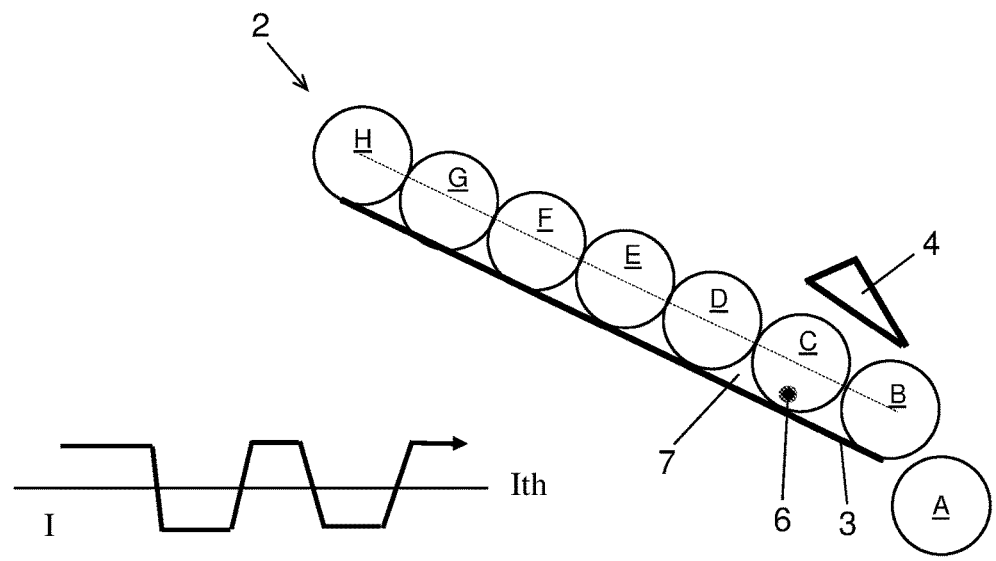

FIG. 3*e* shows the moment at which the line 2 continues to advance such that the beam 6 of light detects the third orange C in the line 2. At this instant, the graph again shows an intensity (I) value that is higher than the predetermined threshold (Ith) value. As a result, the detection means 5 count a second space, which indicates that the device has provided two oranges A and B.

Figure 3F:
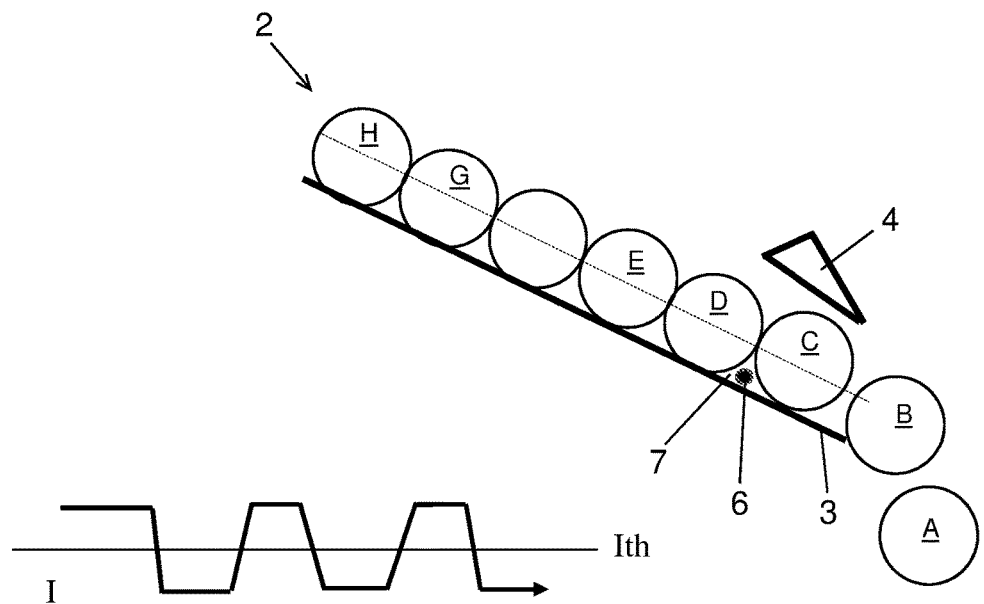

FIG. 3*f* shows the moment at which the line 2 continues to advance such that the beam 6 of light detects the gap 7 between the third orange C and the fourth contiguous orange D in the line 2. The graph shows how the intensity (I) value detected is again lower than the predetermined threshold (Ith) value.

Figure 3G:
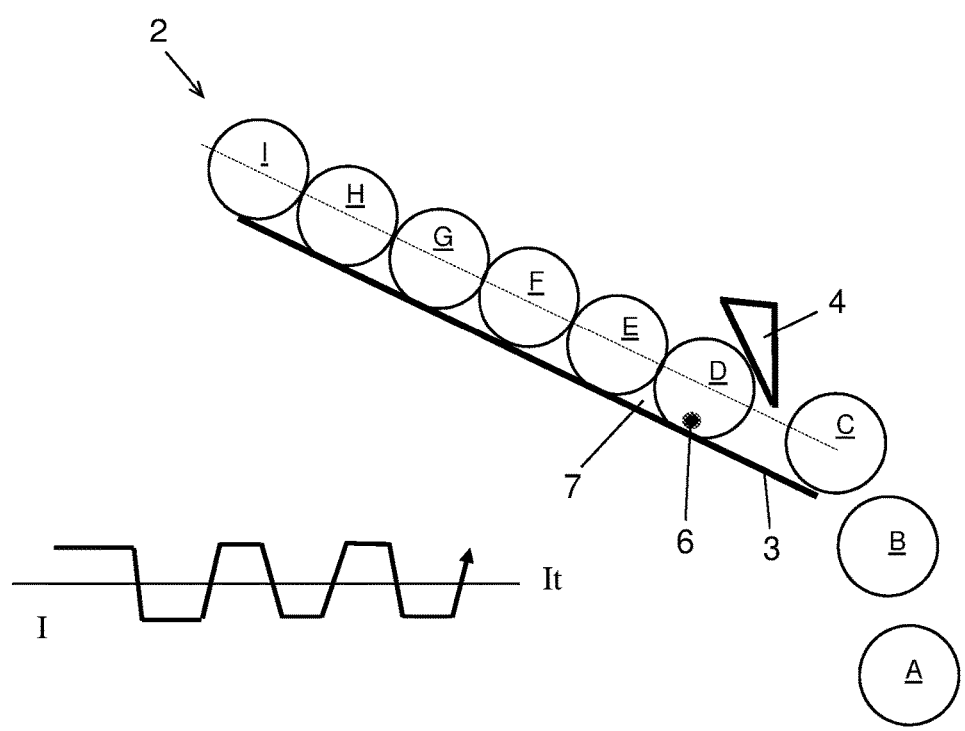

FIG. 3*g* shows the moment at which the line 2 continues to advance such that the beam 6 of light detects the fourth orange D in the line 2. At this instant, the graph again shows an intensity (I) value that is higher than the predetermined threshold (Ith) value. As a result, the detection means 5 count a third space, which indicates that the device has provided three oranges A, B and C.

Likewise, due to the fact that the predetermined number of oranges, three oranges in this example, has now been reached, it may be seen how the retention means 4 are again actuated, stopping the fourth orange D from passing through, thus interrupting the advance of the line 2.

It is also worth noting that in this example the striking point of the detection beam 6 is arranged upstream from the retention means 4. This ensures that when the predetermined number of oranges has been reached, the retention means 4 can act immediately to retain the next orange, which then becomes the first orange in the line 2 to begin a new sequence.

Figure 4:
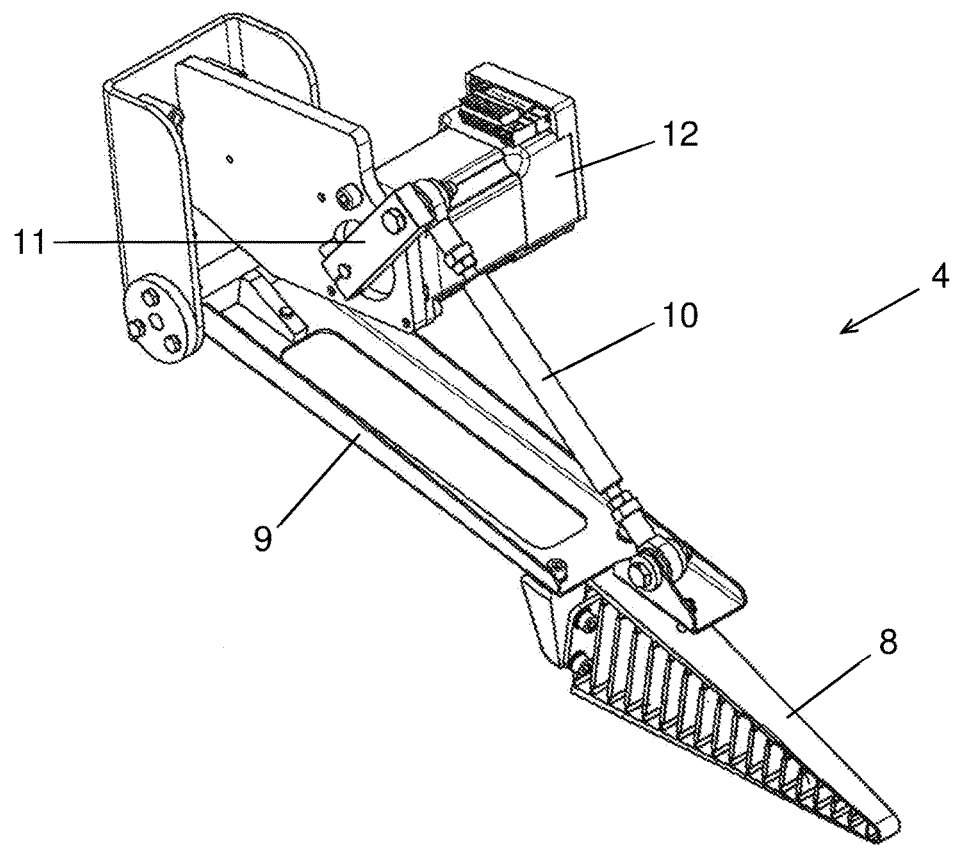
FIG. 4 is a perspective view of the retention means showing the transmission mechanism of the gripper.

With reference to FIGS. 1 and 4, the retention means 4 comprise a gripper 8 provided with flexible fingers capable of adapting to the contour of the first orange A in the line 2. In particular, it is envisioned that a gripper with Fin Ray Effect® technology or similar will be used, as it enables flexible gripping of objects having a variety of shapes.

According to a preferred embodiment, the gripper 8 is mounted on the end of a pivoting support 9 that is actuated by means of a connecting rod and crank mechanism, the crank 10 being articulated at one end to the pivoting support 9 at a point near to the gripper 8 and at the other end to the connecting rod 11, and said connecting rod 11 being actuated by an electric motor 12, such that when the motor 12 rotates in one direction, the gripper 8 is capable to be raised, allowing the line 2 of oranges A,B,C,D,E,F,G to advance along the chute 3, and when the motor 12 rotates in the opposite direction the gripper 8 is capable to be descended until entering into contact with the first orange A in the line 2 to retain it in the chute 3.

The motor 12 is a motor with torque control and with the ability to regulate the upward and downward paths of the gripper 8, whose stroke will depend on the size of the oranges A,B,C,D,E,F,G supplied in the chute 3.

To carry out an initial calibration of the motor, it should be borne in mind that the starting point of work corresponds to the fingers of the gripper 8 touching the chute 3, i.e. in the lowest position. Next, the gripper 8 is raised for the first time by a rotation angle of 9°. If the orange A passes under the gripper 8, the work cycle will continue; otherwise the gripper will be raised another 9°, and so on until the first orange A passes through without interruption. The time that the gripper 8 is up is the time that the predetermined number of oranges to provide need in order to pass through.

Next, the gripper 8 is lowered for the first time until it meets an orange, controlled by the motor's 12 detection of the maximum torque set. The second time the gripper 8 is raised, it again raises 9° with respect to its prior position. In the same way, the time that the gripper 8 is up is the time needed to let through the predetermined number of oranges to provide.

Thereafter, the gripper 8 is lowered a second time until meeting an orange, in the same way as the first time it is lowered, and the work cycles repeat in this way successively.

Furthermore, the chute 3 has a tilt greater than 4° to ensure that the line 2 of contiguous oranges A,B,C,D,E,F,G moves at a suitable speed along the chute 3, taking advantage of the fact that said oranges can be counted very quickly and effectively. It has been found that the optimum tilt value is 8°.

Likewise, as can be seen in FIG. 1, the chute 3 is provided with vibration means 13 to help the line 2 of contiguous oranges A,B,C,D,E,F,G move along the chute 3, keeping it from getting jammed. Said vibration means 13 are adapted to deliver a vibration of at least 5 millimeters of amplitude with a frequency of more than 40 Hz, thereby optimizing the speed at which the line 2 of contiguous oranges A,B,C,D,E,F,G moves along the chute 3.

Figure 5:
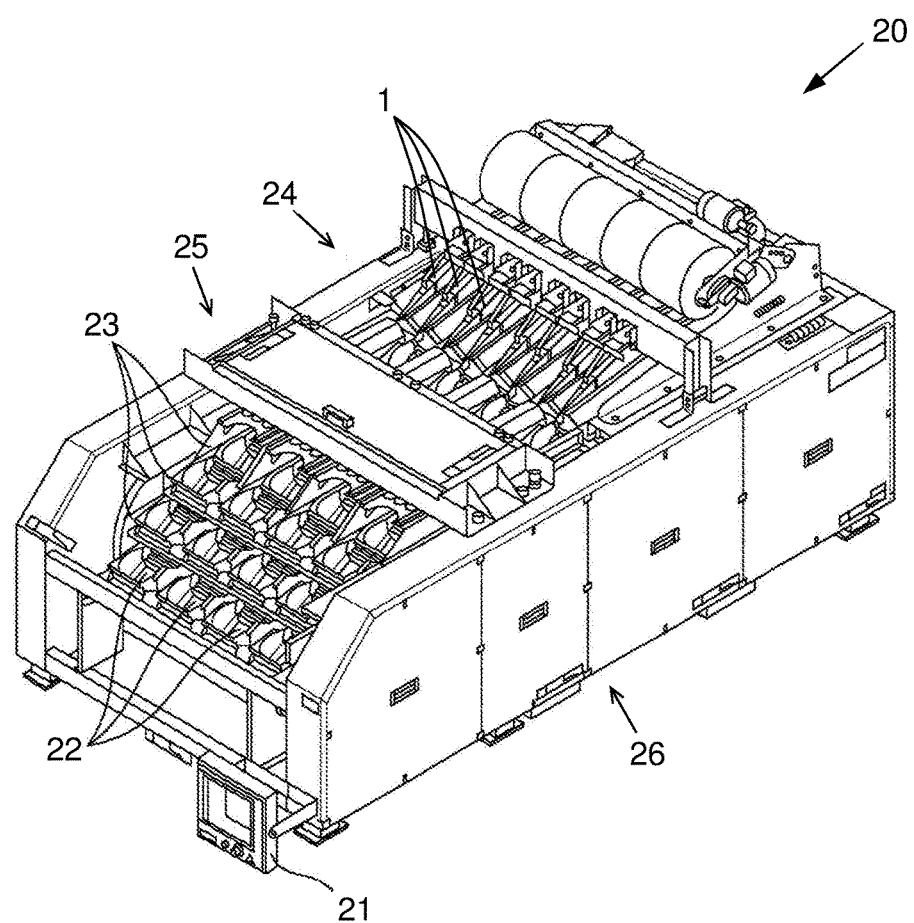
FIG. 5 is a perspective view of a combination weighing machine comprising a plurality of said devices object of the invention.

Now making reference to FIG. 5, the invention also relates to a combination weighing machine 20 comprising a plurality of said devices 1 for providing fruit and vegetable products, such as oranges in this example, said machine 20 being provided with control means 21 adapted to, among other parameters, indicate the number of oranges that should be provided to a bucket 22.

The machine 20 further comprises a transport system that continually moves a series of carriages 23 along a closed path that comprises a straight top section, a straight bottom section, and two curved sections linking said top and bottom sections, such that each carriage 23 holds several buckets 22. Moreover, it includes a series of work stations distributed all along the path followed by the buckets 22, in particular, a loading station 24 for loading oranges A,B,C,D,E,F,G to provide to the buckets 22, a weighing station 25 for weighing the buckets 22, arranged on the top straight section of the path followed by the carriages 23, and a selective unloading station 26 (not shown in FIG. 5) for unloading the oranges loaded in the buckets 22, arranged on the bottom straight section. Likewise, the control means 21 process the weighing data and select the buckets 22 whose total weight is closest to a predetermined value for unloading.

According to the embodiment shown in FIG. 5, it is envisaged to place two devices 1 connected to the same bucket 22. In this way, the number of oranges provided to each bucket 22 is duplicated, thereby optimizing the production time of the machine 20.

Figure 6:
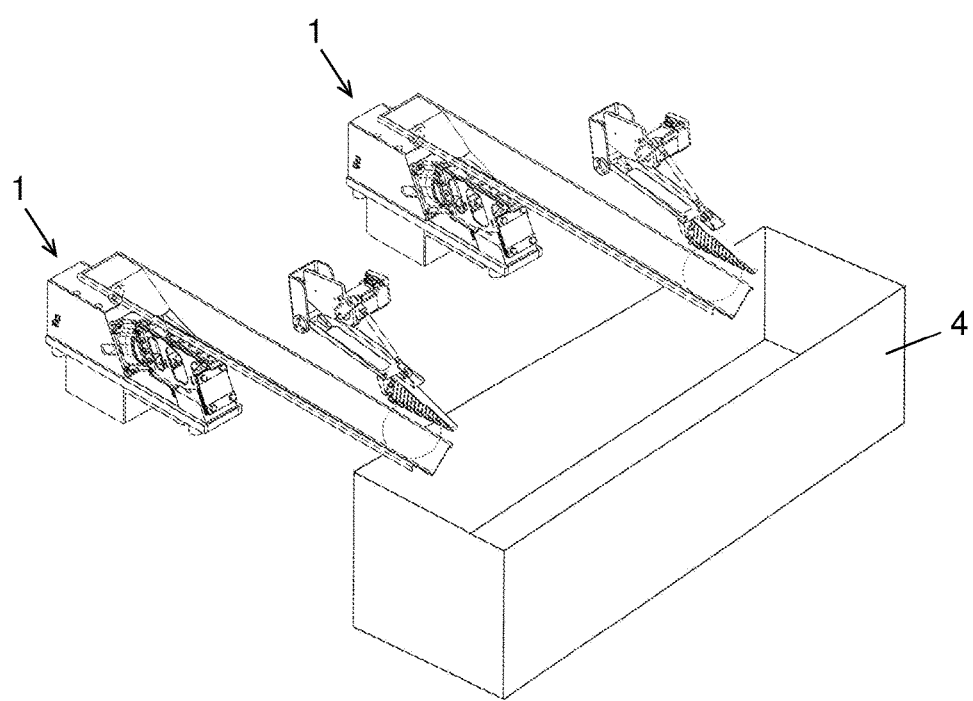
FIG. 6 is a perspective view of an embodiment with two devices object of the invention that provide elements to the same bucket.

FIG. 6 is a more schematic illustration of this particular ordering of the devices 1 in the machine 20, specifically to be able to supply products to a same bucket 22 using two chutes 3, each one of which is associated with emission and detection means 5 of the beam 6 of light and with retention means 4.

The invention claimed is:

1. A device capable of providing a predetermined number of stored elements forming a line and touching each other, comprising:
a supply chute along which the line may advance, said elements being essentially spheroidal;
retention means, capable to be actuated by a motor, adapted to retaining a first element in the line and preventing the line from sliding and advancing, and to stop retaining the first element in the line, allowing the line to advance along the chute; and
a light emitter and detector that emits a steady beam of light aimed at the chute, adapted to count signal variations produced in said beam by the advance of the line, specifically by the passage of the spaces between two consecutive elements in the line through the detection beam, the beam being aimed at the gaps that necessarily will be formed in the line between two consecutive elements even if they are in contact with each other, due to the effect of said elements being spheroidal, and adapted to actuating the retention means to stop retaining the first element in the line, and actuating again the retention means to retain a next element in the line when the signal variations reach a number equal to the predetermined number of elements; and
wherein the retention means comprises a flexible gripper configured to adapt to a contour of the first element in the line, wherein the gripper is mounted on an end of a pivoting support that is actuated by a connecting rod and crank mechanism, the crank being articulated at one end to the pivoting support at a point near to the gripper and at the other end to the connecting rod, and said connecting rod being actuated by the motor, such that rotations of the motor in one direction raises the gripper, allowing the line of elements to advance along the chute, and rotation of the motor in the opposite direction descends the gripper until contacting the first element in the line to retain the first element in the line in the chute.

2. The device according to claim 1, wherein the light emitter and detector are configured to count the variations in an intensity of the detection beam, so that during the step of detecting the beam, each time a reduction in the intensity of the reflected beam is detected, below a predetermined threshold, and immediately thereafter an increase in the intensity of the reflected beam, above a predetermined threshold, a space is counted.

3. The device according to claim 1, wherein the supply chute has a V-shaped transverse cross section determining two walls joined by a bottom vertex, the detection beam being aimed adjacent to one of the walls to strike the other wall at a point that is located away from the bottom vertex.

4. The device according to claim 3, wherein said distance between the striking point of the detection beam and the bottom vertex of the chute is between 0.1 and 30 millimeters.

5. The device according to claim 4, wherein the detection beam is parallel to said first wall of the chute, and the distance separating the beam from said first side wall of the chute is 3 to 5 mm.

6. The device according to claim 1, wherein the striking point of the detection beam is arranged upstream from the retention means.

7. The device according to claim 1, wherein the motor is a motor with torque control, whose torque calibration depends on a size of the elements supplied in the chute, and allows the motor to be stopped during a retention maneuver when the resistive torque surpasses a previously calibrated value.

8. The device according to claim 1, wherein a tilt of the chute is greater than 4°.

9. The device according to claim 8, wherein the tilt of the chute is 8°.

10. The device according to claim 1, wherein the chute is provided with a vibrator that delivers a vibration of at least 5 millimeters of amplitude with a frequency of more than 40 Hz.

11. A machine comprising:
a plurality of devices according to claim 1; and
control means adapted to indicate, to each device, the number of elements each device should provide to a bucket that the respective chute opens into.

12. The machine according to claim 11, wherein every two devices provide elements to the same bucket.

13. A method for dispensing a predetermined number of elements from a chute, each element having a spheroidal shape, comprising:

aligning elements in a single file with the chute so that the elements are in the single file abutting one another at abutments points;

controlling advancement of the single file of elements down the chute by selectively blocking a leading element in the single file;

emitting a beam of light across the chute at a location that is below the abutment points;

counting each element that crosses the beam of light by detecting signal variations produced in the beam of light, the signal variations corresponding to gaps between two consecutive abutting elements at a location where the two elements do not abut each other due to the spheroidal shape of the elements;

stopping the advancement of the single file of elements down the chute after the signal variations reach a predetermined number.

14. The method according to claim 13, wherein the signal variations are variations in an intensity of the beam of light.

15. The method according to claim 14, wherein during the step of detecting signal variations, each time a reduction in the intensity of the beam of light is detected, below a predetermined threshold, and immediately thereafter an increase in the intensity of the beam of light, above a predetermined threshold, a space is counted.

16. The device according to claim 1, wherein the elements are fruit.

17. The method according to claim 13, wherein the elements are fruit.

\* \* \* \* \*